(12) United States Patent
Jin et al.

(10) Patent No.: US 12,401,990 B2
(45) Date of Patent: Aug. 26, 2025

(54) METHOD AND APPARATUS FOR REPORTING USER EQUIPMENT CAPABILITY IN WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 17/917,373

(22) PCT Filed: Apr. 14, 2021

(86) PCT No.: PCT/KR2021/004708
§ 371 (c)(1),
(2) Date: Oct. 6, 2022

(87) PCT Pub. No.: WO2021/215739
PCT Pub. Date: Oct. 28, 2021

(65) Prior Publication Data
US 2023/0156459 A1 May 18, 2023

(30) Foreign Application Priority Data

Apr. 22, 2020 (KR) .......................... 10-2020-0048866

(51) Int. Cl.
*H04W 8/24* (2009.01)
*H04L 5/14* (2006.01)

(52) U.S. Cl.
CPC ............. *H04W 8/24* (2013.01); *H04L 5/1438* (2013.01)

(58) Field of Classification Search
CPC ................................ H04L 5/1438; H04W 8/24
See application file for complete search history.

(56) References Cited

U.S. PATENT DOCUMENTS

| | | |
|---|---|---|
| 2016/0262053 A1 | 9/2016 | Palm et al. |
| 2020/0344832 A1* | 10/2020 | Hu .................... H04W 72/0453 |
| 2021/0243590 A1 | 8/2021 | Jin et al. |

FOREIGN PATENT DOCUMENTS

KR   10-2020-0118724 A   10/2020

OTHER PUBLICATIONS

Intel Corporation, Email Disc on [99bis#28][NR] UE capability ASN.1 structure, 3GPP Draft, R2-1712677, Reno, USA; Dec. 2, 2017, XP051372668.

(Continued)

*Primary Examiner* — Brian P Cox
(74) *Attorney, Agent, or Firm* — Jefferson IP Law, LLP

(57) ABSTRACT

Provided are a method and apparatus for reporting UE capability in a wireless communication system, and an operation method of a UE in the wireless communication system includes receiving a UE capability inquiry message including information about a new radio (NR) frequency band from a BS, generating UE capability information by considering an additional UE capability supported for a supplementary uplink (SUL) as being equal to an additional UE capability supported for frequency division duplex (FDD) when the information about the NR frequency band includes information about a frequency band related to the SUL and the UE supports the frequency band related to the SUL, and transmitting the generated UE capability information to the BS.

6 Claims, 13 Drawing Sheets

(56) References Cited

OTHER PUBLICATIONS

Nokia et al., UE capabilities for pairing of SDL and SUL, 3GPP Draft, R4-1815002 Spokane, USA, Nov. 11, 2018, XP051559333.
Samsung, xDD Differentiation of UE Capabilities for SUL/SDL Bands, 3GPP Draft, R2-2100439, Jan. 15, 2021, XP051973619.
Extended European Search Report dated Jul. 6, 2023, issued in European Application No. 21792334.1.
Korean Office Action dated Oct. 21, 2024, issued in Korean Application No. 10-2020-0048866.
3GPP, TS 38.331 V16.0.0, TSG RAN, NR, Radio Resource Control (RRC) protocol specification (Release 16), Mar. 2020.
Mediatek Inc., Correction to need code for capabilityRequestFilterCommon, 3GPP TSG-RAN2 Meeting #109bis-e Online, R2-2002724, Apr. 20-30, 2020.
3GPP, TS 38.306 V16.0.0, TSG RAN, NR, User Equipment (UE) radio access capabilities (Release 16), Mar. 2020.
Qualcomm Incorporated et al., Introduction of UE capability for ULSUP with FDD band, 3GPP TSG-RAN2 Meeting #109bis_e Electronic, R2-2002577, Apr. 20-30, 2020.
International Search Report dated Jul. 23, 2021, issued in International Patent Application No. PCT/KR2021/004708.

\* cited by examiner

METHOD AND APPARATUS FOR REPORTING USER EQUIPMENT CAPABILITY IN WIRELESS COMMUNICATION SYSTEM

TECHNICAL FIELD

The present disclosure relates to a method and apparatus for reporting user equipment capability in a wireless communication system.

BACKGROUND ART

To meet the demand with respect to ever-increasing wireless data traffic since the commercialization of the 4th generation (4G) communication system, there have been efforts to develop an advanced 5th generation (5G) or pre-5G communication system. For this reason, the 5G or pre-5G communication system is also called a beyond fourth generation (4G) network communication system or post long-term evolution (LTE) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (CoMP), interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent information technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing IT technologies and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

With the development of the aforementioned technologies and wireless communication systems, it is possible to provide various services, and thus, there is a need for a method for seamlessly providing the services.

DESCRIPTION OF EMBODIMENTS

Solution to Problem

Based on the aforementioned discussion, the present disclosure provides an apparatus and method for effectively reporting user equipment capability in a wireless communication system.

BEST MODE

Figure 1A:
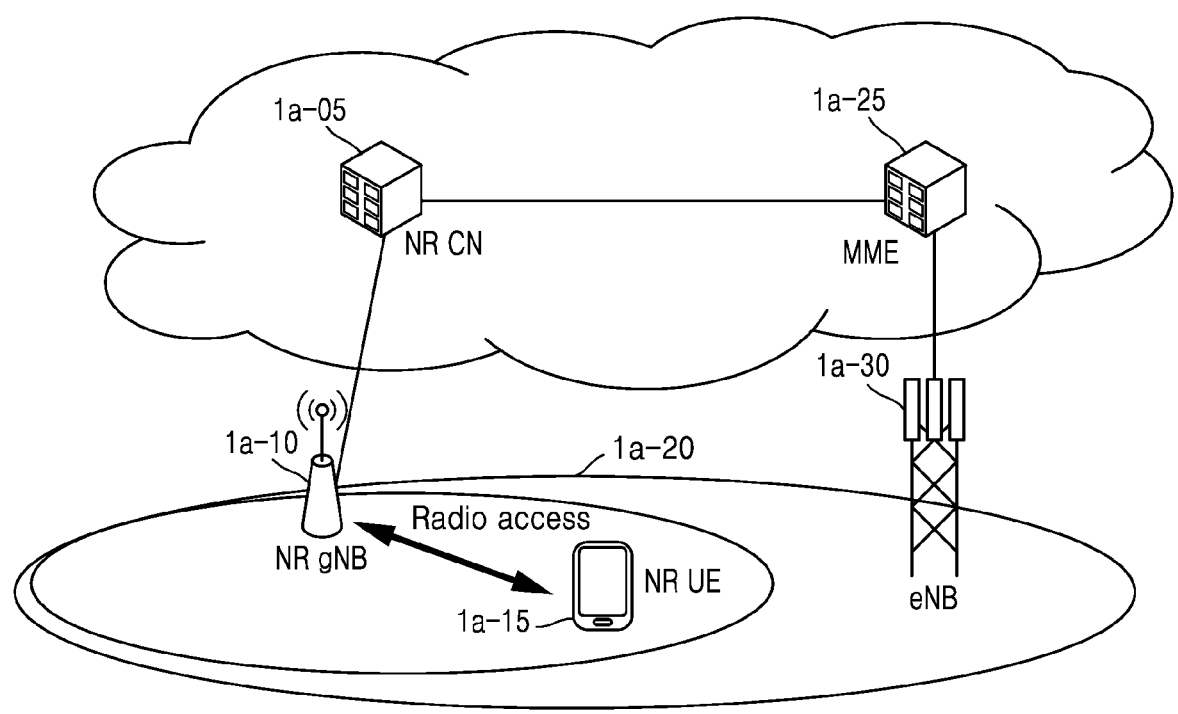
FIG. 1A illustrates a structure of a next generation mobile communication system to which the present disclosure is applied.

According to an embodiment of the present disclosure, an operation method of a user equipment (UE) in a wireless communication system includes receiving a UE capability inquiry message including information about a new radio (NR) frequency band from a base station (BS), generating UE capability information by considering an additional UE capability supported for a supplementary uplink (SUL) as being equal to an additional UE capability supported for frequency divisional duplex (FDD) when the information about the NR frequency band includes information about a frequency band related to the SUL and the UE supports the frequency band related to the SUL, and transmitting the generated UE capability information to the BS.

According to an embodiment of the present disclosure, a UE in a wireless communication system includes a transceiver, and at least one processor configured to receive a UE capability inquiry message including information about an NR frequency band from a BS through the transceiver, generate UE capability information by considering an additional UE capability supported for an SUL as being equal to an additional UE capability supported for FDD when the information about the NR frequency band includes information about a frequency band related to the SUL and the UE supports the frequency band related to the SUL, and transmit the generated UE capability information to the BS through the transceiver.

MODE OF DISCLOSURE

Embodiments of the present disclosure will now be described in detail with reference to accompanying drawings. In the description of the present disclosure, when it is determined that a detailed description of associated commonly-used technologies or structures may unnecessarily obscure the subject matter of the present disclosure, the detailed description will be omitted. Further, the terms, as will be mentioned later, are defined by taking functionalities in the present disclosure into account, but may vary depending on practices or intentions of users or operators. Accordingly, the terms should be defined based on descriptions throughout this specification.

Advantages and features of the present disclosure, and methods for attaining them will be understood more clearly with reference to the following embodiments of the present disclosure, which will be described in detail later along with the accompanying drawings. The embodiments of the present disclosure may, however, be embodied in many different forms and should not be construed as limited to the embodiments set forth herein; rather, these embodiments of the present disclosure are provided so that this disclosure will be thorough and complete, and will fully convey the scope of the embodiments of the present disclosure to those of ordinary skill in the art. Like numbers refer to like elements throughout the specification.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments of the present disclosure, the module may include one or more processors.

Descriptions of some well-known technologies that possibly obscure the present disclosure will be omitted, if necessary. Embodiments of the present disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the present disclosure is not limited to the terms as herein used, and may use different terms to refer to the items having the same meaning in a technological sense.

Some of the terms and names defined by the 3rd generation partnership project (3GPP) long term evolution (LTE) will be used hereinafter. The present disclosure is not, however, limited to the terms and definitions, and may equally apply to any systems that conform to other standards. In particular, the present disclosure may be applied to the 3GPP new radio (NR) (which is the 5th generation (5G) mobile communication standard). In the present disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. Obviously, it is not limited thereto.

The present disclosure relates to a method and apparatus for delivering UE capabilities dedicated to uplink and downlink in a next generation mobile communication system.

The present disclosure relates to a mobile communication system, and more particularly, to a method of reporting UE capability for UL-dedicated and DL-dedicated frequency bands when the UE reports its own capability.

The present disclosure describes a series of processes in which a UE receives a request for UE capability from a BS and reports the UE capability to the BS in an NR system. In this case, a procedure for reporting a UE capability that varies depending on a duplex mode and a frequency range among UE capabilities may not be adequate. For UL-dedicated and DL-dedicated frequency bands in particular, there is no procedure for reporting UE capability. Hence, the present disclosure proposes a procedure for reporting the UE capability for the UL-dedicated and DL-dedicated frequency bands.

Through the procedure proposed in the present disclosure, an NR UE may report different UE capabilities for the UL-dedicated and DL-dedicated frequency bands when the NR UE reports its capability.

FIG. 1A illustrates a structure of a next generation mobile communication system to which the present disclosure is applied.

Referring to FIG. 1A, a wireless access network of the next generation mobile communication system may include a next generation base station (NR gNB) 1a-10 and a new radio core network (NR CN) or next generation core network (NG CN) 1a-05. A UE or a new radio UE (NR UE) 1c-15 may access an external network via the NR gNB 1a-10 and the NR CN 1a-05.

In FIG. 1A, the NR gNB 1a-10 may correspond to an evolved Node B (eNB) of the existing LTE system. The NR gNB 1a-10 may be connected to the NR UE 1a-15 on a radio channel, and may provide much better services than the existing node B does. In the next generation mobile communication system, all user traffic may be served on a shared channel, so a device to collect status information, such as buffer status of UEs, available transmission power status, channel condition, etc., for scheduling is required, and the NR gNB 1a-10 may serve as the device. A single NR gNB 1a-10 may generally control a number of cells. To attain ultrahigh speed data transfer as compared to LTE, more than the existing maximum bandwidth may be used, and an additional beamforming technology may be integrated with an orthogonal frequency division multiplexing (OFDM) radio access technology. Furthermore, an adaptive modulation and coding (AMC) scheme that determines a modulation scheme and a channel coding rate according to the channel condition of the UE may be used. The NR CN 1a-05 may perform functions such as mobility support, bearer setup, QoS setup, etc. The NR CN 1a-05 is a device responsible for various control functions as well as mobility management functionality for the UE, and may be connected to a number of BSs. Moreover, the next generation mobile communication system may cooperate even with the LTE system, in which case the NR CN 1a-05 may be connected to a mobility management entity (MME) 1a-25 through a network interface. The MME 1a-25 may be connected to the eNB 1a-30, which is an existing BS.

Figure 1B:
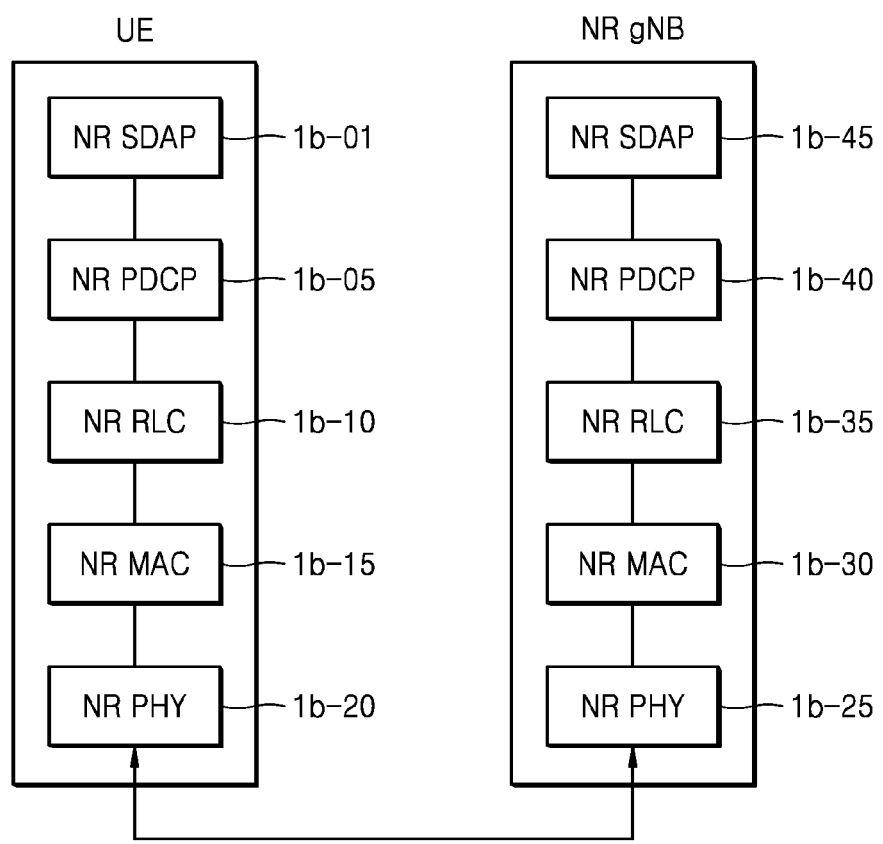
FIG. 1B illustrates a radio protocol architecture of a next generation mobile communication system to which the present disclosure is applicable.

FIG. 1B illustrates a radio protocol architecture of a next generation mobile communication system to which the present disclosure is applicable.

Referring to FIG. 1B, a radio protocol of a next generation mobile communication system in each of a UE and an NR gNB may include an NR service data adaptation protocol (NR SDAP)) 1b-01 or 1b-45, an NR Packet Data Convergence Protocol (NR PDCP)) 1b-05 or 1b-40, an NR Radio Link Control (NR RLC)) 1b-10 or 1b-35, and an NR Medium Access Control (NR MAC)) 1b-15 or 1b-30.

Main functions of the NR SDAP 1b-01 or 1b-45 may include some of the following functions:
 transfer of user plane data
 mapping between a quality of service (QoS) flow and a data radio bearer (DRB) for both UL and DL
 marking a QoS flow identity (ID) for both UL and DL packets
 mapping of a reflective QoS flow to a DRB for UL SDAP PDUs.

For an SDAP layer device, the UE may be configured as to whether to use a header of the SDAP layer device or whether to use a function of the SADP layer device for each PDCP layer device or each bearer or each logical channel based on an RRC message. Furthermore, when the SDAP header is configured, a 1-bit non-access stratum (NAS) reflective QoS indicator (NAS reflective QoS) and a 1-bit access stratum (AS) reflective QoS indicator (AS reflective QoS) may indicate for the UE to update or reconfigure the mapping information of the QoS flow and the data bearer for UL or DL. The SDAP header may include QoS flow ID information indicating a QoS. The QoS information (e.g., QoS flow ID Information) may be used for data process priority, scheduling information, etc., for smooth services.

Main functions of the NR PDCP layer 1b-05 or 1b-40 may include some of the following functions:
 header compression and decompression (e.g., header compression and decompression: ROHC only)
 user data transfer
 sequential delivery (e.g., in-sequence delivery of higher layer PDUs)
 non-sequential delivery (e.g., out-of-sequence delivery of higher layer PDUs)
 reordering (e.g., PDCP PDU reordering for reception)
 duplicate detection (e.g., duplicate detection of lower layer SDUs)
 retransmission (e.g., retransmission of PDCP SDUs)
 ciphering and deciphering
 timer-based SDU discarding (e.g., timer-based SDU discarding in uplink)

The reordering of the NR PDCP device may refer to a function of reordering PDCP PDUs received from a lower layer based on PDCP sequence numbers (SNs). The reordering of the NR PDCP device may include a function of transferring data to a higher layer in the reordered sequence or transferring the data directly to the higher layer without considering the sequence. Moreover, the reordering of the NR PDCP device may include a function of reordering the sequence to record missing PDCP PDUs, a function of reporting status of missing PDCP PDUs to a transmitting end, or a function of requesting retransmission of missing PDCP PDUs.

Main functions of the NR RLC 1b-10 or 1b-35 may include some of the following functions:
- data transfer (e.g., transfer of higher layer PDUs)
- sequential delivery (e.g., in-sequence delivery of higher layer PDUs)
- non-sequential delivery (e.g., out-of-sequence delivery of higher layer PDUs)
- ARQ (e.g., error correction through ARQ)
- concatenation, segmentation, and reassembling (e.g., concatenation, segmentation and reassembly of RLC SDUs)
- re-segmentation (e.g., re-segmentation of RLC data PDUs)
- reordering (e.g., reordering of RLC data PDUs)
- duplicate detection
- error detection (e.g., protocol error detection)
- RLC SDU discard
- RLC re-establishment In the aforementioned sequential delivery function (in-sequence delivery) of the NR RLC device may refer to a function of delivering RLC SDUs received from a lower layer to a higher layer in sequence. The sequential delivery function of the NR RLC device may include a function of receiving, reassembling and delivering multiple RLC SDUs resulting from segmentation of one original RLC SDU, a function of reordering the received RLC PDUs based on RLC SNs or PDCP SNs, a function of reordering the sequence to record missing RLC PDUs, a function of reporting status of missing RLC PDUs to a transmitting end, a function of requesting retransmission of missing PDCP PDUs, a function, when there is a missing RLC SDU, of delivering RLC SDUs before the missing RLC SDU to a higher layer in sequence, a function, when there is a missing RLC SDU but a timer is expired, of delivering all RLC SDUs received before the timer starts to a higher layer in sequence, or a function, when there is a missing RLC SDU but a timer is expired, of delivering all RLC SDUs received up to present to a higher layer in sequence. Furthermore, the sequential delivery of the NR RLC device may include a function of delivering RLC PDUs to a PDCP device regardless of the sequence (out-of-sequence delivery) by processing the RLC PDUs in the order of reception (or in the order of arrival without regard to the order of the SNs), or a function, when the RLC PDU is segmented, of reassembling the segments stored in a buffer or to be received later into one complete RLC PDU, processing and delivering the RLC PDU to a PDCP device. The NR RLC layer may not include the concatenation function, and the concatenation function may be performed in the NR MAC layer or replaced with the multiplexing function of the NR MAC layer.

The non-sequential delivery function of the NR RLC device may refer to a function of delivering RLC SDUs received from a lower layer directly to a higher layer without regard to the sequence of the RLC SDUs, and include a function of receiving, reassembling and delivering multiple RLC SDUs resulting from segmentation of an original RLC SDU, and a function of storing RLC SNs or PDCP SNs of the received RLC PDUs and reordering the received RLC PDUs to record missing RLC PDUs.

The NR MAC layer 1b-15 and 1b-30 may be connected to multiple NR RLC layer devices configured in the same UE, and main functions of the NR MAC layer 10-40 and 10-55 may include some of the following functions:
- mapping (e.g., mapping between logical channels and transport channels)
- multiplexing and demultiplexing function (e.g., multiplexing/demultiplexing of MAC SDUs)
- scheduling information report function
- HARQ (e.g., error correction through HARQ)
- logical channel priority control (e.g., priority handling between logical channels of one UE)
- UE priority control function (e.g., priority handling between UEs by means of dynamic scheduling)
- MBMS service identification
- transport format selection
- padding The NR PHY layer 1b-20 or 1b-25 may perform channel coding and modulation on higher layer data, form the data into OFDM symbols and send them on a radio channel, or may demodulate OFDM symbols received on a radio channel, perform channel decoding on them and send the result to a higher layer.

Figure 1C:
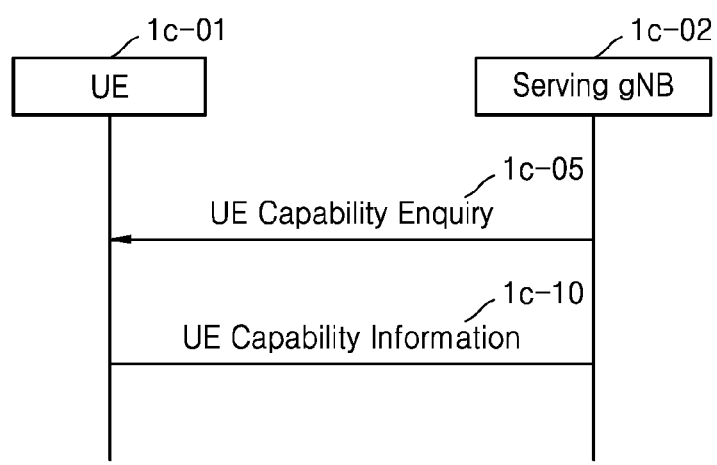
FIG. 1C illustrates messages related to user equipment (UE) capability reporting in a new radio (NR) system.

FIG. 1C illustrates messages related to UE capability reporting in an NR system. Specifically, FIG. 1C illustrates a message structure for reporting UE capability in an NR system, and more particularly, an operation in which the UE sends the UE capability according to UE capability request filtering of the BS.

Basically, a UE 1c-01 may perform a procedure for reporting a capability supported by the UE to a serving gNB 1c-02 (hereinafter, gNB) while connected to the gNB 1c-02. In operation 1c-05, the gNB may send a UE capability inquiry message requesting to report a capability to the UE in the connected state. The UE capability inquiry message may include a UE capability request for each radio access technology (RAT) type requested by the gNB to the UE. The request for each RAT type may include requested frequency band information according to priority. Furthermore, the UE capability inquiry message may be used to request a plurality of RAT types using one RRC message container. Alternatively, the gNB may send the UE capability inquiry message including the request for each RAT type to the UE multiple times. Specifically, the UE capability inquiry of operation 1c-05 may be repeated multiple times, and the UE may then configure a corresponding UE capability information message to match a response to the request, and report the matched response. In the next generation mobile communication system, a request for UE capability for NR, LTE, evolved-universal terrestrial radio access new radio dual connectivity (EN-DC), and multi-radio dual connectivity (MR-DC) may be performed. For reference, it is common to initially transmit the UE capability inquiry message after the UE is connected to the gNB and the gNB is aware of the connection, but the UE capability inquiry message may be transmitted in any condition when required by the gNB.

Upon receiving a request to report the UE capability from the gNB in operation 1c-05, the UE may configure a UE capability according to an RAT type and frequency band information requested from the gNB. In other words, the UE may receive the UE capability inquiry message from the gNB, and configure a UE capability based on RAT type information and frequency band information included in the UE capability inquiry message. How the UE configures a UE capability in an NR system is described as follows:

1. When the UE receives a request for a UE capability for some or all of RAT types including LTE, EN-DC and NR from the gNB, and simultaneously receive a list of LTE and NR frequency bands, the UE may configure a band combination for EN-DC and NR stand-alone (SA). Specifically, the UE may configure a candidate BC list for the EN-DC and NR SA based on frequency bands requested from the BS in FreqBandList. The configuring of the candidate BC list may be defined as a candidate band combination compiling operation. Furthermore, priorities of the bands may be set in an order listed in FreqBandList. The configuring of the candidate BC list may be performed once regardless of the RAT type or may be performed repeatedly for each RAT type.

In the following operations, a procedure corresponding to each RAT type may be performed, in which case priorities are given in the order of NR, MR-DC and LTE.

2. When an "eutra-nr-only" flag or an "eutra" flag is set for the RAT type of the UE capability request message, the UE may totally discard things about NR SA BCs from the configured candidate BC list. This may happen only when an LTE eNB requests an "eutra" capability.

3. Subsequently, the UE may discard fallback BCs from the candidate BC list configured in the above operation. The fallback BC corresponds to a super set BC from which a band corresponding to at least one SCell is eliminated, and may be omitted because the super set BC may already cover the fallback BC. This operation (3) may also be applied to EN-DC, i.e., even LTE bands. The remaining BCs after this operation may refer to a final "candidate BC list".

4. The UE may select BCs to be reported by selecting BCs that suit the requested RAT type from the final "candidate BC list". In this operation, the UE may configure supportedBandCombinationList in a set order. Specifically, the UE may configure BCs and UE capability to be reported in a preset RAT type order. The preset RAT type order may refer to a sequence of nr, eutra-nr, and eutra. Furthermore, the UE may configure featureSetCombination for the configured supportedBandCombinationList, and configure a "candidate feature set combination" list from the candidate BC list from which a list of the fallback BCs (including equal or low-level capability) is eliminated. The "candidate feature set combinations" include all feature set combinations for NR and EUTRA-NR BCs, and may be obtained from feature set combinations of UE-NR-Capabilities and UE-MRDC-Capabilities containers.

5. Furthermore, when the requested RAT type is eutra-nr, which affects supportedBandCombination of the corresponding EN-DC or MR-DC, featureSetCombinations may be set according to the associated RAT type and may all be included in two containers of UE-MRDC-Capabilities and UE-NR-Capabilities. However, a feature set of NR may only include UE-NR-Capabilities.

After the UE capability is configured, the UE may transmit a UE capability information message including the UE capability to the gNB, in operation 1c-10. The BS may then perform scheduling and transmission/reception management suitable for the UE based on the UE capability received from the UE. The operations of FIG. 1C illustrate a method by which the UE delivers a UE capability corresponding to RF parameters. Operations of storing and delivering the UE's own normal capability, e.g., UE capabilities for physical parameters, MAC parameters, radio link control (RLC) parameters, packet data convergence protocol (PDCP) parameters, measurement/mobility parameters, etc., will be described in connection with FIG. 1D.

Figure 1D:
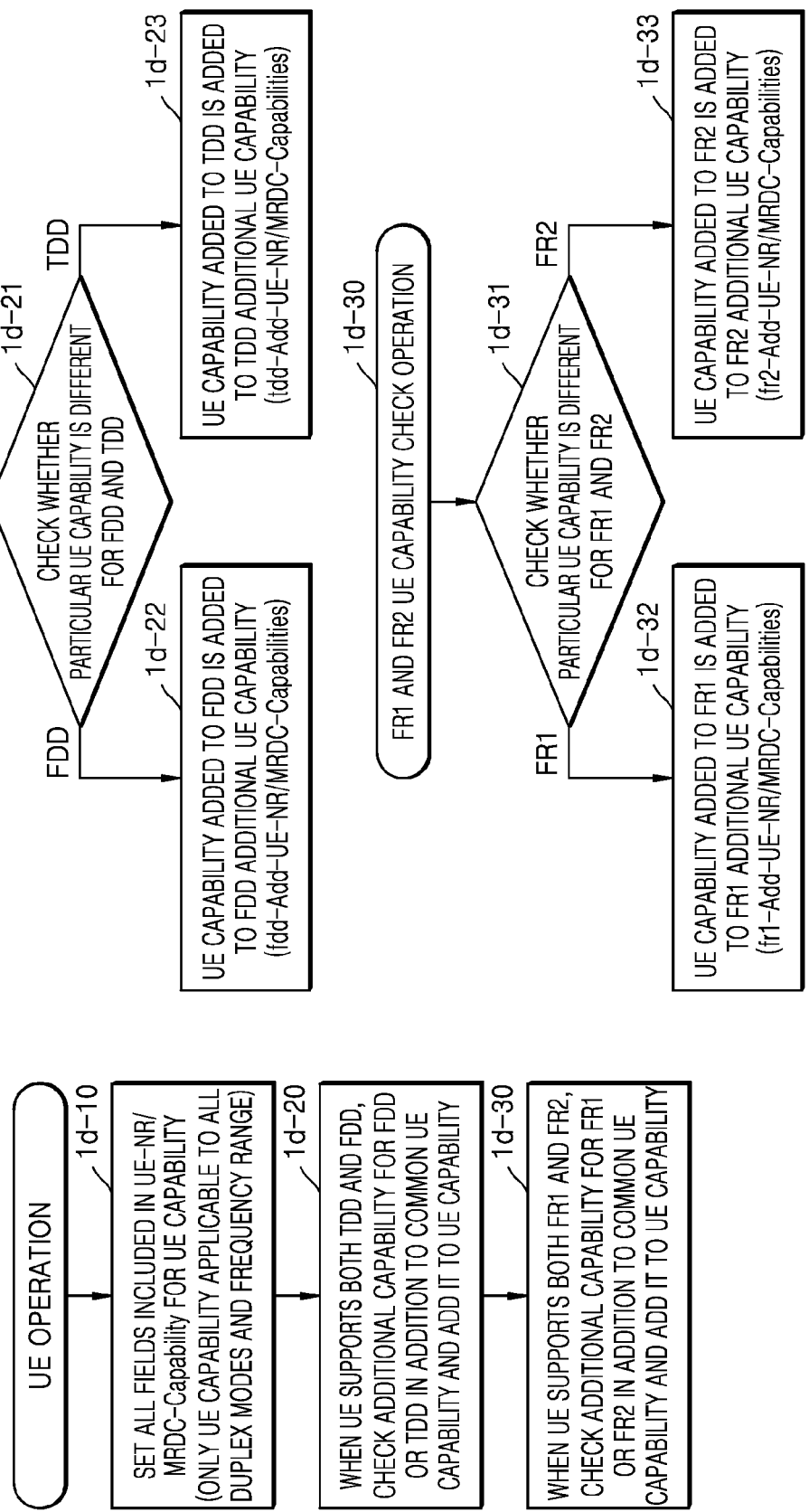
FIG. 1D illustrates UE operations to store and deliver a UE capability when the UE receives a UE capability information request from a base station (BS) in a wireless communication system, according to an embodiment of the present disclosure.

FIG. 1D illustrates UE operations to store and deliver a UE capability when the UE receives a UE capability information request from a BS in a wireless communication system, according to an embodiment of the present disclosure. In other words, FIG. 1D illustrates operations to store and deliver a UE capability, which are applied to all UEs, when the UE receives a UE capability information request from a gNB in an NR system to which an embodiment of the present disclosure refers.

As described above in connection with FIG. 1C, when the UE receives a UE capability request message from the gNB in operation 1c-05, the UE generates UE capability information by considering a request included in associated filtering, and add the generated UE capability information to a UE capability information message and send the UE capability information message to the gNB in operation 1c-10. That is, a method by which the UE delivers a UE capability corresponding to RF parameters is illustrated in FIG. 1C. On the other hand, operations of storing and delivering the UE's own normal capability, e.g., UE capabilities for physical parameters, MAC parameters, RLC parameters, PDCP parameters, measurement/mobility parameters, etc., will be described in detail in connection with FIG. 1D.

When the UE receives a UE information request from the gNB, the UE may set all the fields included in UE-NR-Capability for UE capability in operation 1d-10. Specifically, in operation 1d-10, information about physical parameters, MAC parameters, RLC parameters, PDCP parameters, measurement/mobility parameters, and RF parameters may be set and added to the UE capability. In operation 1d-10, the UE may set the information to include only UE capability applicable to all duplex modes FDD and TDD and frequency ranges FR1 and FR2. In this case, FDD may refer to frequency division duplex and TDD may refer to time division duplex. FR1 may refer to frequency range 1 corresponding to an NR frequency band equal to or less than 7.125 GHz, and FR2 may refer to frequency range 2 corresponding to an NR frequency band above 7.125 GHz. For example, adding to the UE capability in operation 1d-10 is described in RRC standard ASN.1 as follows:

```
UE-NR-Capability ::=           SEQUENCE {
    accessStratumRelease           AccessStratumRelease,
    pdcp-Parameters                PDCP-Parameters,
    rlc-Parameters                 RLC-Parameters                                                          OPTIONAL,
    mac-Parameters                 MAC-Parameters                                                          OPTIONAL,
    phy-Parameters                 Phy-Parameters,
    rf-Parameters                  RF-Parameters,
    measAndMobParameters           MeasAndMobParameters                                                    OPTIONAL,
    fdd-Add-UE-NR-Capabilities     UE-NR-CapabilityAddXDD-Mode                                             OPTIONAL,
    tdd-Add-UE-NR-Capabilities     UE-NR-CapabilityAddXDD-Mode                                             OPTIONAL,
    fr1-Add-UE-NR-Capabilities     UE-NR-CapabilityAddFRX-Mode                                             OPTIONAL,
    fr2-Add-UE-NR-Capabilities     UE-NR-CapabilityAddFRX-Mode                                             OPTIONAL,
    featureSets                    FeatureSets                                                             OPTIONAL,
    featureSetCombinations         SEQUENCE (SIZE (1..maxFeatureSetCombinations)) OF FeatareSetCombination OPTIONAL,
    lateNonCriticalExtension       OCTET STRING                                                            OPTIONAL,
    nonCriticalExtension           UE-NR-Capability-v1530                                                  OPTIONAL
}
Phy-Parameters ::=             SEQUENCE {
    phy-ParametersCommon           Phy-ParametersCommon                                    OPTIONAL,
```

-continued

| | | |
|---|---|---|
| phy-ParametersXDD-Diff | Phy-ParametersXDD-Diff | OPTIONAL, |
| phy-ParametersFRX-Diff | Phy-ParametersFRX-Diff | OPTIONAL, |
| phy-ParametersFR1 | Phy-ParametersFR1 | OPTIONAL, |
| phy-ParametersFR2 | Phy-ParamatersFR2 | OPTIONAL |
| } | | |
| MeasAndMobParameters ::= | SEQUENCE { | |
| measAndMobParametersCommon | MeasAndMobParametersCommon | OPTIONAL, |
| measAndMobParametersXDD-Diff | MeasAndMobParametersXDD-Diff | OPTIONAL, |
| measAndMobParametersFRX-Diff | MeasAndMobParametersFRX-Diff | OPTIONAL |
| } | | |

In operation 1d-10, the UE may set information other than fdd-Add-UE-NR-Capabilities, tdd-Add-UE-NR-Capabilities, fr1-Add-UE-NR-Capabilities, and fr2-Add-UE-NR-Capabilities. The four fields listed above (e.g., fdd-Add-UE-NR-Capabilities, tdd-Add-UE-NR-Capabilities, fr1-Add-UE-NR-Capabilities, and fr2-Add-UE-NR-Capabilities) are containers in which to set and deliver the UE capability when the UE capability is different depending on the duplex mode or frequency range. In other words, operation 1d-10 may include a procedure for setting and storing a UE capability applied in common to all UEs, a UE capability applied in common to duplex modes, a UE capability applied in common to frequency ranges, etc. As many parameters (e.g., physical parameters, MAC parameters, RLC parameters, PDCP parameters, measurement/mobility parameters or RF parameters) may have the same UE capability for all the UEs, all duplexing, all frequency ranges as described above, in operation 1d-10, the UE may set parameters that may have the same capability, helping a reduction in signaling.

Among the aforementioned UE capability information in particular, parameters listed in Table 1 below may refer to parameters included in Phy-Parameters and MeasAndMobParameters, which may have different UE capability values depending on the duplex mode and the frequency range. Table 1 may represent whether a related feature is supported for an xDD (FDD or TDD) and an FRx (FR1 or FR2) depending on a container in which it is included.

TABLE 1

| Field name | Value range |
|---|---|
| dynamicSFI | ENUMERATED {supported} |
| twoPUCCH-F0-2-ConsecSymbols | ENUMERATED {supported} |
| twoDifferentTPC-Loop-PUSCH | ENUMERATED {supported} |
| twoDifferentTPC-Loop-PUCCH | ENUMERATED {supported} |
| dl-SchedulingOffset-PDSCH-TypeA | ENUMERATED {supported} |
| dl-SchedulingOffset-PDSCH-TypeB | ENUMERATED {supported} |
| ul-SchedulingOffset | ENUMERATED {supported} |
| handoverInterF | ENUMERATED {supported} |
| handoverLTE-EPC | ENUMERATED {supported} |
| handoverLTE-5GC | ENUMERATED {supported} |

In other words, Table 1 represents UE capability parameters classified for FRx or xDD.

In operation 1d-20, when the UE supports both TDD and FDD, the UE may check whether there is an additional capability supported with another value in addition to a UE capability applied in common to the entire duplex of FDD or TDD (e.g., a common UE capability). Furthermore, there is a difference in UE capability, the UE may perform an operation of setting and delivering the UE capability in a TDD or FDD container.

According to an embodiment, operation 1d-20 may be referred to as an FDD and TDD UE capability check operation, and in an embodiment, operation 1d-20 may include operations 1d-21, 1d-22 and 1d-23. Specifically, in operation 1d-21, the UE may check whether a particular UE capability differs between FDD and TDD. When a UE capability that is different from the common UE capability previously indicated is an FDD UE capability, the UE may deliver UE capability by adding UE capability to the FDD in an FDD additional UE capability (fdd-Add-UE-NR/MRDC-Capabilities), in operation 1d-22. On the other hand, in operation 1d-21, the UE may check whether a particular UE capability differs between FDD and TDD, and when a UE capability that is different from the common UE capability previously indicated is a TDD UE capability, the UE may deliver the UE capability by adding the UE capability to the TDD in a TDD additional UE capability (tdd-Add-UE-NR/MRDC-Capabilities), in operation 1d-23.

After operation 1d-20 is performed, when the UE supports both FR1 and FR2 in operation 1d-30, the UE may check an additional capability supported for FR1 or FR2 in addition to the UE capability applied in common to the aforementioned all frequency ranges (e.g., FR1 and RF2), and when there is a difference in UE capability, the UE may perform an operation of setting and delivering the UE capability in the particular FR1 or FR2 container.

According to an embodiment, operation 1d-30 may be referred to as an FR2 and FR2 UE capability check operation, and in an embodiment, operation 1d-30 may include operations 1d-31, 1d-32 and 1d-33. Specifically, in operation 1d-31, the UE may check whether a particular UE capability differs between FR1 and FR2, and when a UE capability that is different from the common UE capability previously indicated is an FR1 UE capability, the UE may deliver the UE capability by adding the UE capability to the FR1 in an FR1 additional UE capability (fr1-Add-UE-NR/MRDC-Capabilities), in operation 1d-32. On the other hand, in operation 1d-31, the UE may check whether a particular UE capability differs between FR1 and FR2, and when a UE capability that is different from the common UE capability previously indicated is an FR2 UE capability, the UE may deliver the UE capability by adding the UE capability to the FR2 in an FR2 additional UE capability (fr2-Add-UE-NR/MRDC-Capabilities), in operation 1d-33.

The operation of checking a difference in UE capability for FDD and TDD in operation 1d-20 and the operation of checking a difference in UE capability for FR1 and FR2 in operation 1d-30 are performed in separate procedures and do not affect each other's procedure. That the UE supports a particular capability in FR1 means supporting a related function in the FR1 band regardless of TDD or FDD, and on the contrary, that the UE supports a related function in TDD means supporting the function in all TDD bands regardless of FR1 or FR2. Specifically, in a particular case (e.g., case 2 in Table 2 below, which does not support FR1-TDD but only supports FR1-FDD and FR2-TDD), there is no signal present for the UE to indicate this. Table 2 below takes an example of combinations of FRx and xDD.

TABLE 2

| | Support combinations | Not support combinations |
|---|---|---|
| Case 0 | none | All |
| Case 1 | FR1-TDD, FR2-TDD | FR1-FDD |
| Case 2 | FR1- FDD, FR2-TDD | FR1-TDD |
| Case 3 | FR1-TDD, FR1-FDD, FR2-TDD | None |
| Case 4 | FR2-TDD | FR1-TDD, FR1-FDD |
| Case 5 | FR1-TDD, FR1-FDD | FR2-TDD |
| Case 6 | FR1-TDD | FR1-FDD, FR2-TDD |
| Case 7 | FR1-FDD | FR1-TDD, FR2-TDD |

A method of delivering UE capability to represent the case of Table 2, i.e., a method of adding to and delivering UE capability information in combinations of FRx and xDD will be described in Table 3 below. In other words, Table 3 describes a signaling method for possible xDD-FRx combinations.

TABLE 3

| Row | FDD-ADD | TDD-ADD | FR1-ADD | FR2-ADD | Combinations supported by RAN2 | Combination required by RAN1 |
|---|---|---|---|---|---|---|
| 1 | 0 | 0 | 0 | 0 | No- Differentiation | Case 0<br>Case 3: FR1-TDD/FR1-FDD/FR2-TDD<br>(no support of FR2-FDD would be implicitly indicated by absent of FR2-FDD Band combination) |
| 2 | 0 | 0 | 0 | 1 | FR2-TDD<br>FR2-FDD | |
| 3 | 0 | 0 | 1 | 0 | FR1-TDD<br>FR1-FDD | Case 5: FR1-TDD/FR1-FDD |
| 4 | 0 | 0 | 1 | 1 | Not-valid<br>(No-Differentiation) | |
| 5 | 0 | 1 | 0 | 0 | FR1-TDD<br>FR2-TDD | Case 1 FR1-TDD/FR1-TDD |
| 6 | 0 | 1 | 0 | 1 | FR2-TDD | Case 4: FR2-TDD |
| 7 | 0 | 1 | 1 | 0 | FR1-TDD | Case 6: FR1-TDD |
| 8 | 0 | 1 | 1 | 1 | Not-valid | |
| 9 | 1 | 0 | 0 | 0 | FR1-FDD<br>FR2-FDD | |
| 10 | 1 | 0 | 0 | 1 | FR2-FDD | |
| 11 | 1 | 0 | 1 | 0 | FR1-FDD | Case 7: FR1-FDD |
| 12 | 1 | 0 | 1 | 1 | Not-valid | |
| 13 | 1 | 1 | 0 | 0 | Not-valid | |
| 14 | 1 | 1 | 0 | 1 | Not-valid | |
| 15 | 1 | 1 | 1 | 0 | Not-valid | |
| 16 | 1 | 1 | 1 | 1 | Not-valid | |
| | | | | | | Case 2: FR1-FDD/FR2-TDD<br>(not support FR1-TDD)<br>If the UE has no FR1-TDD band combination, this combination would equal to row1.<br>If the UE has FR1-TDD band combination, this combination could not be supported in current signalling. |

For reference, 'No-Differenciation' in Table 3 may mean that additional UE capability information for certain FRx and xDD is not to be delivered in a related container after common UE information for previous FRx and xDD is already delivered. 'Not-valid' may mean that related capabilities are all denoted with the same value in additional containers for FR1 and FR2 or that related capabilities are all set to the same value in additional containers for FDD and TDD, which may not be valid UE capability settings.

Figure 1E:
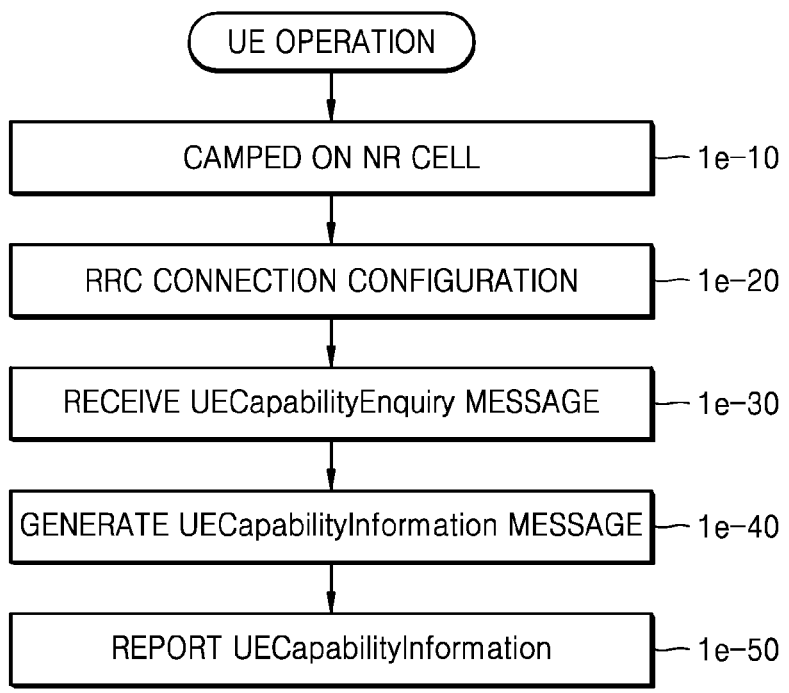
FIG. 1E illustrates operations to deliver UE capability information when the UE receives a UE capability information request from a BS in a wireless communication system, according to an embodiment of the present disclosure.

FIG. 1E illustrates operations to deliver UE capability information when the UE receives a UE capability information request from a BS in a wireless communication system, according to an embodiment of the present disclosure.

Referring to FIG. 1E, in operation 1e-10, the UE may camp on a particular NR cell and may receive system information from the cell. In operation 1e-20, the UE may perform RRC connection with the gNB. In operation 1e-30, the UE may receive UECapabilityEnquiry message from the connected gNB. The UECapabilityEnquiry message may include filtering information such as an RAT type and a frequency. In operation 1e-40, the UE may perform a procedure for generating UE capability information (e.g., UECapabilityInformation) in response to a UE capability request message (e.g., UECapabilityEnquiry message). In embodiments of the present disclosure as will be described later, UE operations in operation 1e-40, i.e., in the operation of generating the UECapabilityInformation message will be described in more detail.

In operation 1e-50, the UE may add the UE information message generated in operation 1e-40 to the UECapability-Information message and deliver the message to the gNB. Upon receiving the UE capability information, the gNB may analyze and decode the information and then apply the resultant information to an RRC setting that takes into account the UE capability.

In an embodiment, a partial operating band of FR1 may be for SUL/SDL but not for FDD nor TDD. In other words, there are bands defined solely for UL and DL, but there is no way to indicate whether a particular feature is supported in the band. Table 4 below is a table that refers to TS 38.101-1 and lists operating bands for FR1.

TABLE 4

| NR operating band | Uplink (UL) operating band | Downlink (DL) operating band | Duplex Mode |
|---|---|---|---|
| n1 | 1920 MHz-1980 MHz | 2110 MHz-2170 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n2 | 1850 MHz-1910 MHz | 1930 MHz-1990 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n3 | 1710 MHz-1785 MHz | 1805 MHz-1880 MHz | FDD |
| n30[3] | 2305 Mhz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n5 | 824 MHz-849 MHz | 869 MHz-894 MHz | FDD |
| n50 | 1432 MHz-1517 MHz | 1432 MHz-1517 MHz | TDD[1] |
| n51 | 1427 MHz-1432 MHz | 1427 MHz-1432 MHz | TDD |
| n65 | 1920 MHz-2010 MHz | 2110 MHz-2200 MHz | FDD[4] |
| n66 | 1710 MHz-1780 MHz | 2110 MHz-2200 MHz | FDD |
| n7 | 2500 MHz-2570 MHz | 2620 MHz-2690 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n8 | 880 MHz-915 MHz | 925 MHz-960 MHz | FDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD[5] |
| n91 | 832 MHz-862 MHz | 1427 MHz-1432 MHz | FDD[9] |
| n92 | 832 MHz-862 MHz | 1432 MHz-1517 MHz | FDD[9] |
| n93 | 880 MHz-915 MHz | 1427 MHz-1432 MHz | FDD[9] |
| n94 | 880 MHz-915 MHz | 1432 MHz-1517 MHz | FDD[9] |
| n95[8] | 2010 MHz-2025 MHz | N/A | SUL |

Referring to Table 4, a certain band set for SDL and SUL may or may not be shared with TDD or FDD band.
  SDL: N29 has no corresponding band. The other SDL bands have corresponding TDD bands.
  SUL: N95 has a corresponding TDD band (n34). The others have corresponding FDD bands.

In the following description, first and second embodiments of the present disclosure propose how to denote UE capability for SDL and SUL bands and respective solutions. Furthermore, as for a method of signaling a difference in UE capability for the aforementioned xDD and FRx, a third embodiment proposes a method of signaling a difference in UE capability for all combinations that may be configured with xDD and FRx that are not supported at present.

Figure 1F:
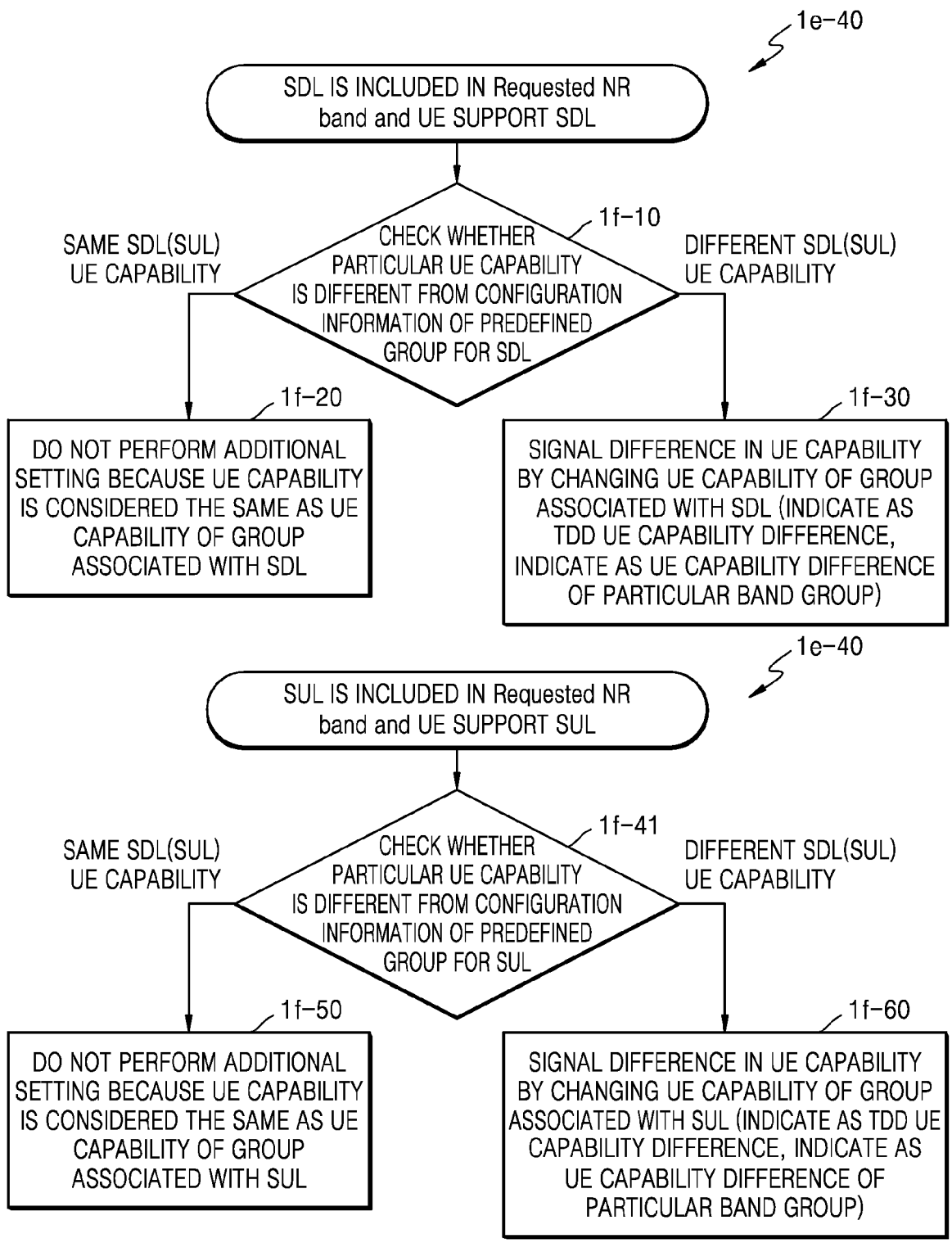
FIG. 1F illustrates a first method of delivering a difference in UE capability for supplementary downlink (SDL) and supplementary uplink (SUL) in a wireless communication system, according to a first embodiment of the present disclosure.

FIG. 1F illustrates a first method of delivering a difference in UE capability for SDL and SUL in a wireless communication system, according to the first embodiment of the present disclosure.

A solution proposed in the present embodiment may refer to a method by which each frequency band for SDL and SUL is predefined in terms of UE capability differentiation depending on TDD/FDD, and which follows the existing TDD/FDD UE capability differentiation. Specifically, the first embodiment may be divided into the following three options:
  Option 1-1: associate SDL and SUL with TDD and FDD, respectively, and apply the corresponding TDD/FDD signaling to SDL and SUL as it is. (This is because all SDL bands except for n29 are shared with TDD bands, and the SDL band may always be used for the TDD band. This is because all SUL bands except for n95 are shared with FDD, and the SUL may be based on operations in the FDD band.)
  Option 1-2: associate SDL with TDD and SUL with TDD or FDD, and apply the corresponding TDD/FDD signaling to SDL and SUL as it is. (This is a method of applying mapping diversity in that band n34 of SUL may be TDD)
  Option 1-3: instead of FDD-add and tdd-add, use FR1-FBSet1-Add and FR1-FBSet2-Add. This is a method of defining FBSet1 (frequency band set 1) and FBSet2 (frequency band set 2) by grouping particular bands in FR1, and when there is a difference in UE capability for containers corresponding to FBSet1 and FBSet2 or the UE capability belongs to a group, setting UE capabilities. An example of this method is as follows:
    FBSet1: allocate n29, n34, n75, n76, and n95 and set associated UE capabilities
    FBSet2: allocate n80, n81, n82, n83, n84, n86, and n89 and set associated UE capabilities A first embodiment of the present disclosure shown in FIG. 1F is characterized in that, in operation 1e-40 of FIG. 1E performed by UE, the UE receives an NR band request for SDL and SUL and performs UE operations for an occasion when the UE supports the SDL and SUL.

For example, when SDL is included in the requested NR band and the UE supports the SDL, the UE may perform operations 1f-10, 1f-20 and 1f-30. In other words, operation 1e-40 of FIG. 1E may include operations 1f-10, 1f-20 and 1f-30.

In operation 1f-10, the UE may check whether a particular UE capability is different from configuration information of a predefined group for SDL, and when the SDL UE capability is the same as a UE capability indicated in the predefined group (e.g., TDD band or FBSet1) associated with SDL, the UE may not perform an operation of setting a difference in additional UE capability as the UE takes into account the same UE capability as that of the group associated with SDL, in operation 1f-20. Operation 1f-10 is characterized in that option 1-1/1-2 follows the same as the UE capability in the TDD band and associated signaling may also follow the same as described in the previous Figure of the present disclosure.

When the SDL UE capability is different from UE capability indicated in the predefined group associated with SDL (e.g., TDD band or FBSet1) in operation 1f-10, the UE may signal a difference of the UE capability by changing the UE capability of the group associated with SDL (indicate a difference of TDD UE capability or indicate a difference of UE capability of a particular band group) in operation 1f-30. Separately from the aforementioned operations, the UE may perform a procedure for checking a difference of UE capability for SUL and storing the UE capability. For example, when SUL is contained in the requested NR band and the UE supports the SUL, the UE may perform operations 1f-40, 1f-50 and 1f-60. In other words, operation 1e-40 of FIG. 1E may include operations 1f-40, 1f-50 and 1f-60.

For example, in operation 1f-40, the UE may check whether a particular UE capability is different from configuration information of a predefined group for SUL, and when the SUL UE capability is the same as a UE capability indicated in the predefined group (e.g., FDD band, TDD band or FBSet2) associated with SUL, the UE may not perform an operation of setting an additional difference in UE capability as the UE takes into account the same UE capability as that of the group associated with SUL, in operation 1f-50. Operation 1f-50 is characterized in that option 1-1/1-2 follows the same as the UE capability in the FDD band (or TDD for n95) and associated signaling may also follow the same as described in the previous Figure of the present disclosure.

When the SUL UE capability is different from UE capability indicated in the predefined group associated with SUL (e.g., FDD band or FBSet2) in operation 1f-40, the UE may signal a difference of the UE capability by changing the UE capability of the group associated with SUL (indicate a difference of FDD/TDD UE capability or indicate a difference of UE capability of a particular band group) in operation 1f-60.

For all the aforementioned solutions, parameters classified into parameters for UL and parameters for DL among the parameters listed in Table 1 may be signaled. Specifically, for SDL, parameters associated with DL (dl-SchedulingOffset-PDSCH-TypeA, dl-SchedulingOffset-PDSCH-TypeB, and ul-SchedulingOffset) may be included, and for SUL, parameters associated with UL (twoPUCCH-F0-2-ConsecSymbols, twoDifferentTPC-Loop-PUSCH, and twoDifferentTPC-Loop-PUCCH) may be included. Furthermore, common parameters (dynamicSFI, handoverInterF, handoverLTE-EPC, and handoverLTE-5GC) may be included for SDL and SUL each.

Figure 1G:
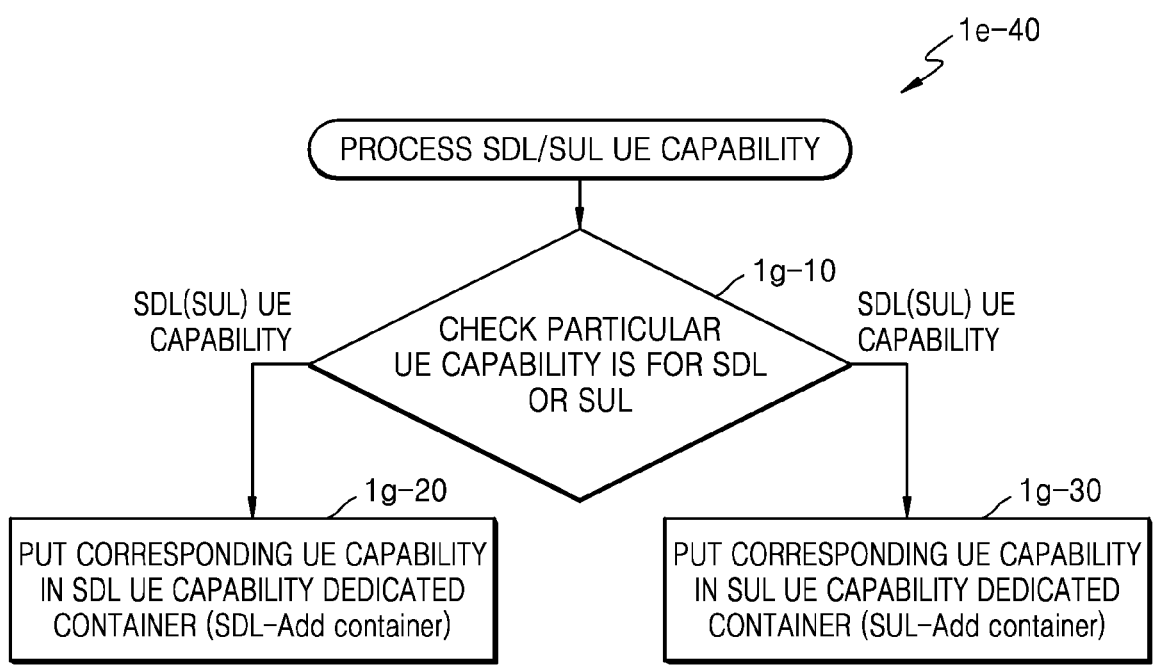
FIG. 1G illustrates a second method of delivering a difference in UE capability for SDL and SUL in a wireless communication system, according to a second embodiment of the present disclosure.

FIG. 1G illustrates a second method of delivering a difference in UE capability for SDL and SUL in a wireless communication system, according to a second embodiment of the present disclosure.

A solution proposed in the present embodiment may refer to a method by which to introduce separate containers in which to deliver UE capabilities for SDL and SUL (i.e., introduce an SUL-Add container and an SDL-Add container), and set features included in the SUL-Add container as being supported by SUL and set features included in the SDL-Add container as being supported by SDL. This is a clearer method, and UE operations for SUL and SDL may be clearly differentiated according to the method according to the second embodiment. Among the parameters listed in Table 1 in particular, parameters for UL and DL may be separated, classified into and stored in SUL-Add container and SDL-Add container, respectively. For example, for SDL, parameters associated with DL (dl-SchedulingOffset-PDSCH-TypeA, dl-SchedulingOffset-PDSCH-TypeB, and ul-SchedulingOffset) may be included, and for SUL, parameters associated with UL (twoPUCCH-F0-2-ConsecSymbols, twoDifferentTPC-Loop-PUSCH, and twoDifferentTPC-Loop-PUCCH) may be included. Furthermore, common parameters (dynamicSFI, handoverInterF, handoverLTE-EPC, and handoverLTE-5GC) may be included for SDL and SUL each.

According to an embodiment, the second embodiment of the present disclosure shown in FIG. 1G may be included in operation 1e-40 of FIG. 1E. For example, the UE may process SDL/SUL UE capability and perform operations 1g-10, 1g-20 and 1g-30. In other words, operation 1e-40 of FIG. 1E may include operations 1g-10, 1g-20 and 1g-30.

Referring to FIG. 1G, in operation 1g-10, the UE may check whether a particular UE capability is for SDL or SUL. For example, the UE may check whether the particular UE capability is different from configuration information of a predefined group for SDL. When the particular UE capability is an SDL UE capability, the UE may add whether to support the SDL UE capability to an SDL-dedicated container (SDL-Add container). When the particular UE capability is an SUL UE capability, the UE may add whether to support the SUL UE capability to an SUL-dedicated container (SUL-Add container) in operation 1g-30. Through this, the UE may separate UE capability for SUL and SDL and signal the UE capability to the gNB.

Figure 1H:
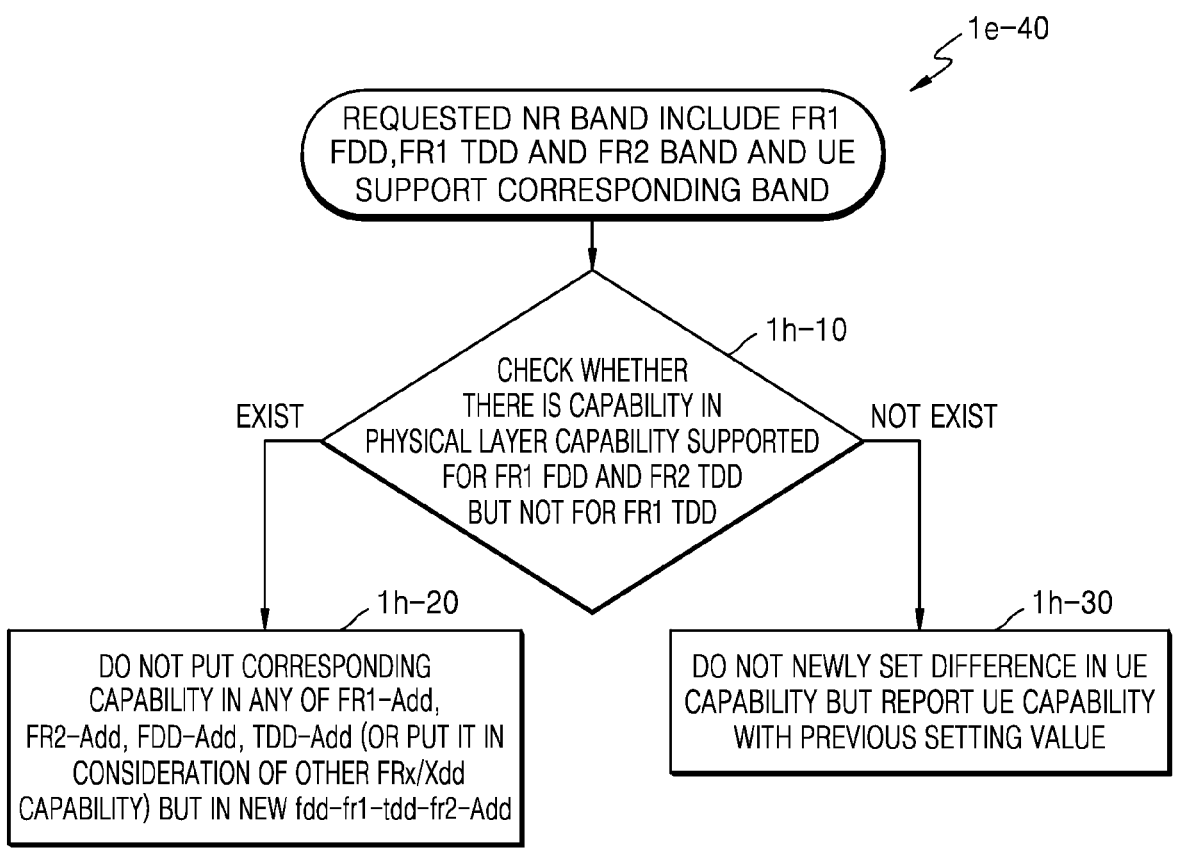
FIG. 1H illustrates a method of delivering a difference in UE capability depending on xDD and FRx, in a wireless communication system, according to a third embodiment of the present disclosure.

FIG. 1H illustrates a method of delivering a difference in UE capability depending on xDD and FRx, in a wireless communication system, according to a third embodiment of the present disclosure.

A solution proposed in the third embodiment of the present disclosure may include introducing an extra container (fdd-fr1-tdd-fr2-Add) in which to deliver a difference in UE capability for all combinations of xDD and FRx and denoting the difference in UE capability for an associated occasion through the extra container when required. A case that the difference in UE capability for the associated occasion needs to be reported may correspond to Case 2 in Table 2 above. In this case, Case 2 in Table 2 may refer to a case that a particular UE capability is supported by the UE for FR1-FDD and FR2-TDD but not for FR1-TDD.

For the third embodiment of the present disclosure shown in FIG. 1H, operation 1e-40 of FIG. 1E may include operations 1h-10, 1h-20 and 1h-30. For example, when requested NR bands include FR1 FDD, FR1 TDD and FR2 bands and the UE supports the bands, the UE may perform operations 1h-10, 1h-20 and 1h-30.

For example, when the requested NR bands include FR1 FDD, FR1 TDD and FR2 bands and the UE supports the bands, the UE may check whether there is a capability supported for FR1 FDD and FR2 TDD and not for FR1 TDD in the physical layer capability in operation 1h-10. When there is a capability supported for FR1 FDD and FR2 TDD but not for FR1 TDD, the UE may set and add the capability to new fdd-fr1-tdd-fr2-Add without adding it to any of FR1-Add, FR2-Add, FDD-Add, and TDD-Add (or by adding it in consideration of other FRx/xDD capabilities) in operation 1h-20. On the other hand, when there is not a capability supported for FR1 FDD and FR2 TDD but not for FR1 TDD, the UE may not newly set a difference in UE capability but may report a UE capability previously set in common for xDD and FRx.

Figure 1I:
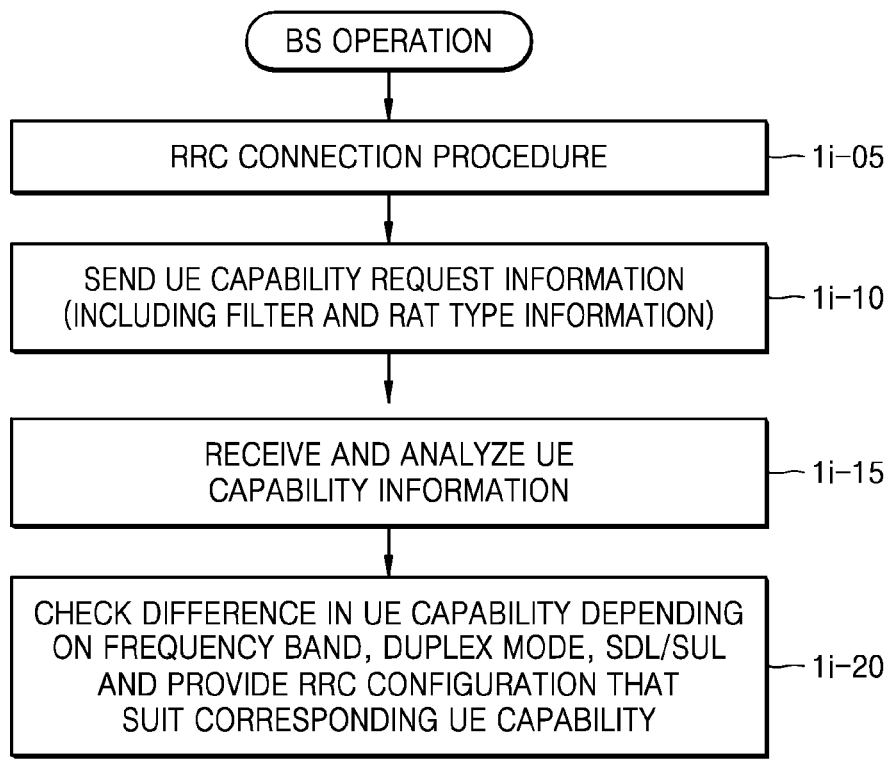
FIG. 1I illustrates operations of a BS and a core network in a wireless communication system, according to an embodiment of the present disclosure.

FIG. 1I illustrates operations of a gNB and a core network in a wireless communication system, according to an embodiment of the present disclosure.

Referring to FIG. 1I, in operation 1i-05, the gNB may perform an RRC connection procedure. Specifically, when a certain UE camps on a cell, the associated gNB may perform the RRC connection procedure to have the UE switched into a connected state. A core network associated with the gNB may receive, through an NAS message (e.g., an ATTACH/REGISTRATION REQUEST message), a UE capability identifier carried in the UE. The UE capability identifier may include a manufacturer-based UE capability ID and a public land mobile network (PLMN)-based UE capability ID, or include only the manufacturer-based UE capability when the PLMN based UE capability ID is not allocated.

In operation 1i-10, the gNB may send UE capability request information. Specifically, the gNB may send a UE capability request message to the UE, and the message may include filtering information such as a RAT type and a frequency.

In operation 1*i*-15, the gNB may receive and analyze UE capability information. For example, the UE may send the UE capability information to the gNB in response to the UE capability request message, and the gNB may obtain UE capability by decoding and analyzing the received UE capability information.

In operation 1*i*-20, the gNB may identify a difference in UE capability depending on the frequency band, duplex mode, and SDL/SUL and provide RRC configurations that suit the UE capability. For example, the gNB may analyze the received UE capability information to identify information to be applied to the UE. Especially, in the present disclosure, the BS may check that there is a difference in UE capability for SDL and SUL, which is then delivered, and may reflect the checked information to be used in RRC configuration.

Figure 1J:
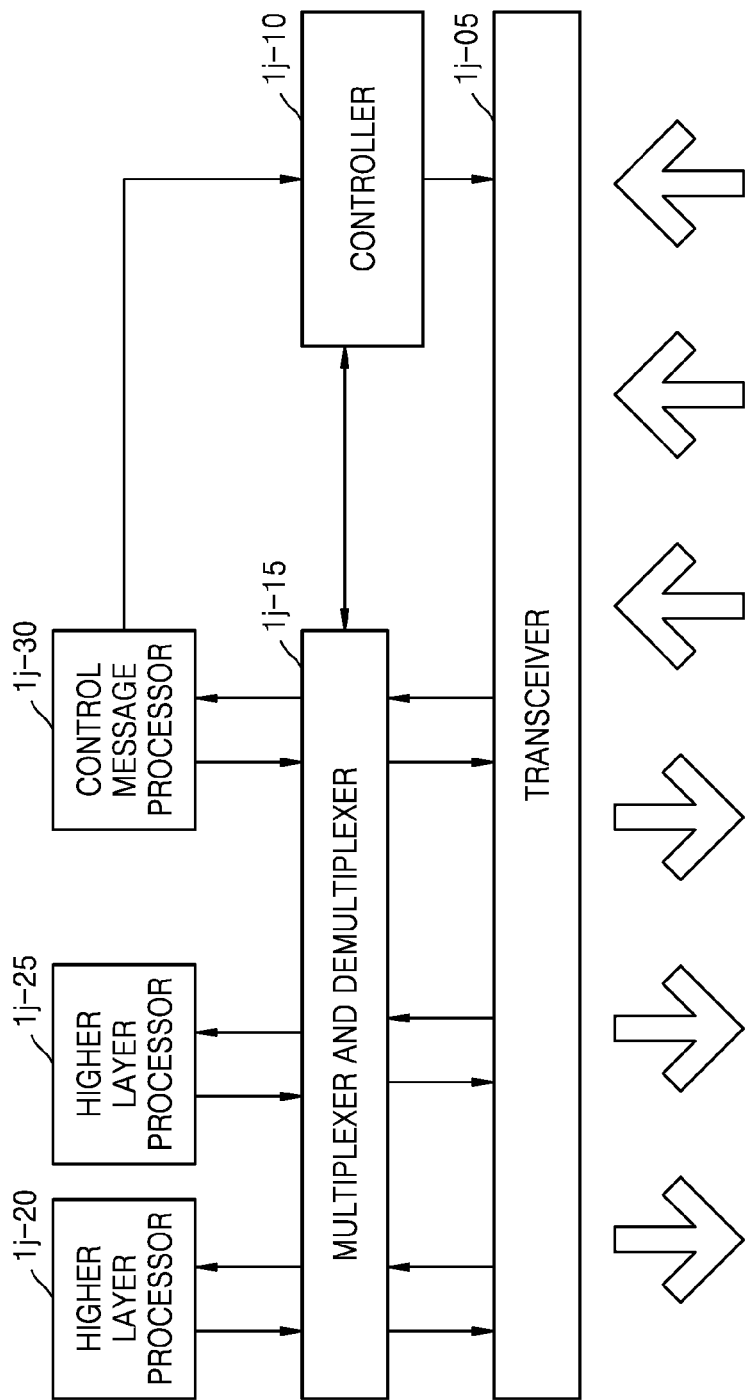
FIG. 1J illustrates a block configuration of a UE in a wireless communication system, according to an embodiment of the present disclosure.

FIG. 1J is a block diagram of a UE in a wireless communication system, according to an embodiment of the present disclosure.

As shown in FIG. 1J, the UE according to the embodiment of the present disclosure may include a transceiver 1*j*-05, a multiplexer and demultiplexer 1*j*-15, various higher layer processors 1*j*-20 and 1*j*-25 and a control message processor 1*j*-30.

Referring to FIG. 1J, the transceiver 1*j*-05 may receive data and certain control signals on a forward channel of a serving cell and transmit data and certain control signals on a backward channel. When multiple serving cells are set up, the transceiver 1*j*-05 may perform data transmission or reception and control signal transmission or reception through the multiple serving cells. The multiplexer and demultiplexer 1*j*-15 may serve to multiplex data generated in the higher layer processors 1*n*-20 and 1*n*-25 or the control message processor 1*j*-30 or demultiplex data received from the transceiver 1*j*-05 and deliver the multiplexing or demultiplexing result to the higher layer processors 1*j*-20 and 1*j*-25 or the control message processor 1*j*-30. The control message processor 1*j*-30 may transmit or receive a control message to or from a BS and perform a required operation. In an embodiment, the control message processor 1*j*-30 may include a function of processing a control message such as an RRC message and an MAC control element (CE), and an RRC message receiving function about CBR measurement report, resource pool, and UE operations. The higher layer processors 1*j*-20 and 1*j*-25 may refer to DRB devices and may be configured for each service. The higher layer processors may process data generated in user services, such as File Transfer Protocol (FTP) or Voice over Internet Protocol (VoIP) and deliver the result to the multiplexer and demultiplexer 1*j*-15, or process data delivered from the multiplexer and demultiplexer 1*j*-15 and deliver the result to a higher layer service application. The controller 1*j*-10 may check a scheduling command, e.g., uplink grants received through the transceiver 1*j*-05, and control the transceiver 1*j*-05 and the multiplexer and demultiplexer 1*j*-15 to perform uplink transmission in a proper transmission resource at a suitable point of time. Although the UE is shown as including a plurality of blocks, each block performing a different function, it is merely an embodiment and not limited thereto. For example, the controller 1*j*-10 itself may perform a function of the demultiplexer 1*j*-15.

Figure 1K:
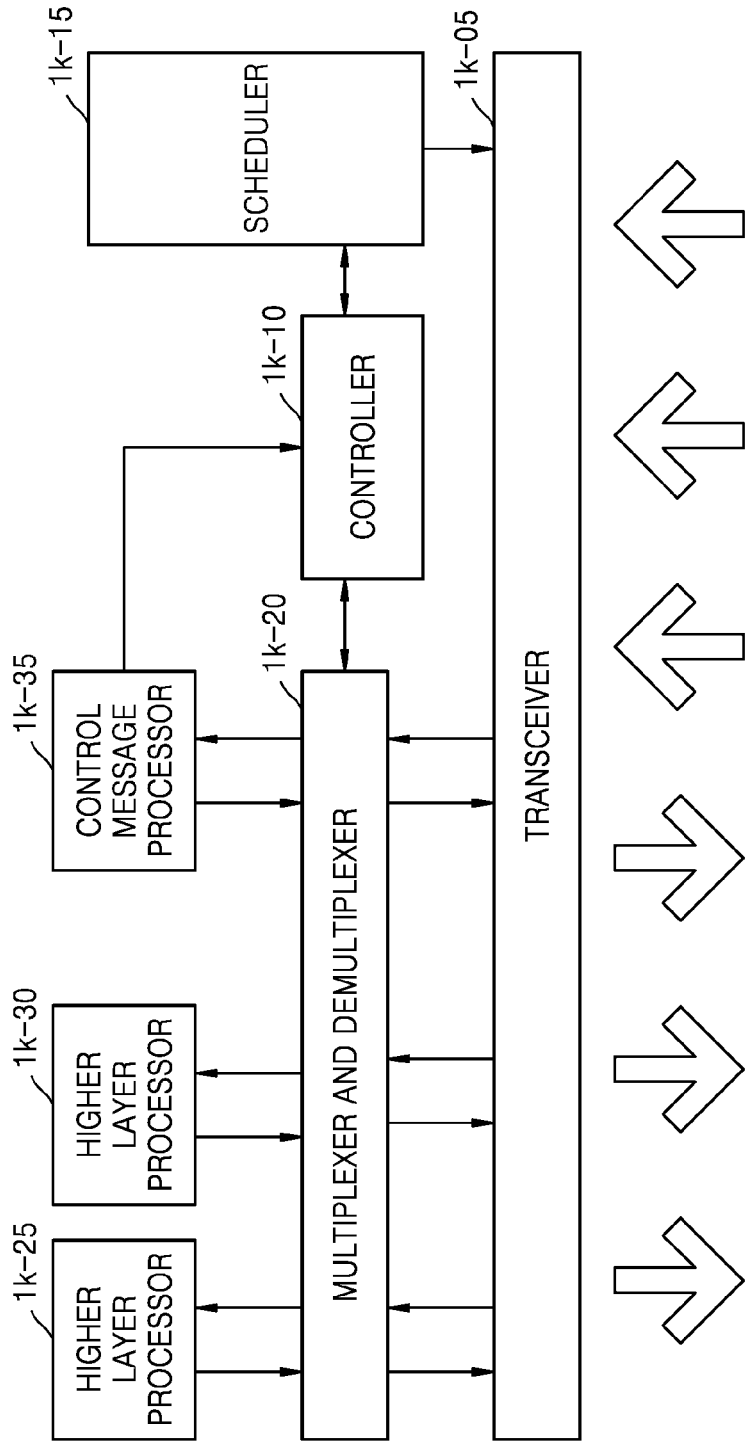
FIG. 1K illustrates a block configuration of a BS in a wireless communication system, according to an embodiment of the present disclosure.

FIG. 1K is a block diagram of a BS in a wireless communication system, according to an embodiment of the present disclosure.

The BS of FIG. 1K may include a transceiver 1*k*-05, a controller 1*k*-10, a multiplexer and demultiplexer 1*k*-20, a control message processor 1*k*-35, various higher layer processors 1*k*-25 and 1*k*-30, and a scheduler 1*k*-15.

Referring to FIG. 1K, the transceiver 1*k*-05 may transmit data and certain control signals on a forward carrier, and receive data and certain control signals on a backward carrier. If multiple carriers are set up, the transceiver 1*k*-05 may perform data transmission and reception and control signal transmission and reception with the multiple carriers. The multiplexer and demultiplexer 1*k*-20 may serve to multiplex data generated in the higher layer processing units 1*k*-25 and 1*k*-30 or the control message processor 1*k*-35 or demultiplex data received from the transceiver 1*k*-05 and deliver the multiplexing or demultiplexing result to the higher layer processors 1*k*-25 and 1*k*-30, the control message processor 1*k*-35, or the controller 1*k*-10. The control message processor 1*k*-35 may receive an instruction from the controller 1*k*-10 to create a control message and deliver the control message to a lower layer. The higher layer processors 1*k*-25 and 1*k*-30 may be configured for each service of each UE, and process data generated in user services, such as FTP or VoIP and deliver the result to the multiplexer and demultiplexer 1*k*-20, or process data delivered from the multiplexer and demultiplexer 1*k*-20 and deliver the result to a higher layer service application. The scheduler 1*k*-15 may allocate transmission resources to the UE at a proper point of time by taking into account a buffer status of the UE, a channel condition, Active Time of the UE, etc., and handle the transceiver to process signals transmitted from the UE or transmit signals to the UE.

Figure 2:
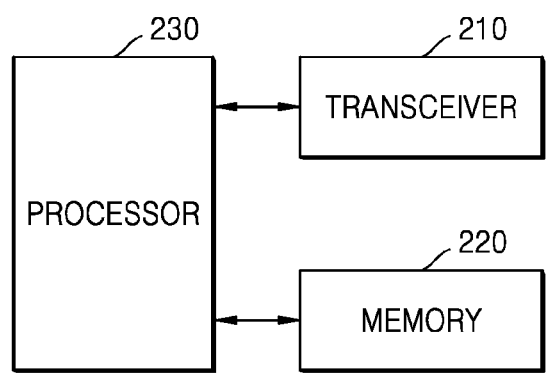
FIG. 2 is a block diagram illustrating a configuration of a UE in a wireless communication system, according to an embodiment of the present disclosure.

FIG. 2 is a block diagram illustrating a configuration of a UE in a wireless communication system, according to an embodiment of the present disclosure.

As shown in FIG. 2, the UE of the present disclosure may include a processor 230, a transceiver 210, and a memory 220. Components of the UE are not, however, limited thereto. For example, the UE may include more or fewer elements than elements described above. In addition, the transceiver 210, the memory 220, and the processor 230 may be implemented in a single chip.

In an embodiment, the processor 230 may control a series of processes for the UE to be operated according to the aforementioned embodiments of the present disclosure. For example, it may control the components of the UE to perform the method of reporting UE capability according to an embodiment of the present disclosure. The processor 230 may be provided in the plural, which may perform the aforementioned operation for reporting UE capability of the present disclosure by carrying out a program stored in the memory 220.

The transceiver 210 may transmit or receive signals to or from a BS. The signals to be transmitted to or received from the BS may include control information and data. The transceiver 210 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 210 are not limited to the RF transmitter and RF receiver. In addition, the transceiver 210 may receive a signal on a wireless channel and output the signal to the processor 230, and transmit a signal output from the processor 230 on a wireless channel.

In an embodiment, the memory 220 may store a program and data required for operation of the UE. Furthermore, the memory 220 may store control information or data included in a signal transmitted or received by the UE. The memory 220 may include a storage medium such as a read only memory (ROM), a random access memory (RANI), a hard disk, a compact disc ROM (CD-ROM), and a digital versatile disk (DVD), or a combination of storage mediums. Moreover, the memory 220 may be in the plural. In an embodiment, the memory 220 may store a program to perform the aforementioned operation of reporting UE capability of the aforementioned embodiments of the present disclosure.

Figure 3:
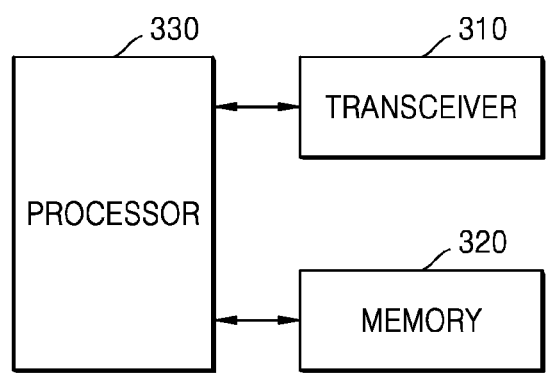
FIG. 3 is a block diagram illustrating a configuration of a BS in a wireless communication system, according to an embodiment of the present disclosure.

FIG. 3 is a block diagram illustrating a configuration of a BS in a wireless communication system, according to an embodiment of the present disclosure.

FIG. 3 is a block diagram of a BS, according to an embodiment of the present disclosure.

Referring to FIG. 3, the BS may include a processor 330, a transceiver 310, and a memory 320. Components of the BS are not, however, limited thereto. For example, the BS may include more or fewer elements than described above. In addition, the transceiver 310, the memory 320, and the processor 330 may be implemented in a single chip.

The processor 330 may control a series of processes for the BS to be operated according to the embodiments of the present disclosure. For example, the processor may control the components of the BS to perform a method of receiving and analyzing UE capability information in a wireless communication system according to embodiments of the present disclosure. The processor 330 may be provided in the plural, which may perform the method of receiving and analyzing UE capability information in a wireless communication system as described above by carrying out a program stored in the memory 320.

The transceiver 310 may transmit or receive signals to or from a UE. The signals to be transmitted to or received from the UE may include control information and data. The transceiver 310 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 310 are not limited to the RF transmitter and RF receiver. In addition, the transceiver 310 may receive a signal on a wireless channel and output the signal to the processor 330, and transmit a signal output from the processor 330 on a wireless channel.

In an embodiment, the memory 320 may store a program and data required for operation of the BS. Furthermore, the memory 320 may store control information or data included in a signal transmitted or received by the BS. The memory 320 may include a storage medium such as a ROM, a RAM, a hard disk, a CD-ROM, and a DVD, or a combination of storage mediums. Moreover, the memory 320 may be in the plural. In an embodiment, the memory 320 may store a program to receive and analyze UE capability information in a wireless communication system in the aforementioned embodiments of the present disclosure.

According to an embodiment of the present disclosure, a UE operation method in a wireless communication system includes receiving a UE capability inquiry message including information about an NR frequency band from a BS, generating UE capability information by considering an additional UE capability supported for an SUL as being equal to an additional UE capability supported for FDD when the information about the NR frequency band includes information about a frequency band related to the SUL and the UE supports the frequency band related to the SUL, and transmitting the generated UE capability information to the BS.

According to an embodiment, the generating of the UE capability information by considering the additional UE capability supported for SUL as being equal to the additional UE capability supported for FDD may include identifying whether an additional UE capability different from a common UE capability is supported for the SUL, configuring a parameter related to the additional UE capability supported for the FDD in FDD additional UE capability information, when the additional UE capability different from the common UE capability is supported for the SUL, and generating the UE capability information to include the FDD additional UE capability information.

According to an embodiment, the FDD additional UE capability information may be information for reporting the additional UE capability supported for the FDD when the UE supports the FDD and TDD and the FDD and the TDD have an additional UE capability different from the common UE capability.

According to an embodiment, the UE operation method in the wireless communication system may further include configuring a common UE capability related to the NR frequency band based on the UE capability inquiry message.

According to an embodiment, the common UE capability may include a UE capability applied to the UE regardless of duplex mode and frequency band.

According to an embodiment, the UE operation method in the wireless communication system may further include generating UE capability information by considering an additional UE capability supported for SDL as being equal to an additional UE capability supported for TDD when the information about the NR frequency band includes information about a frequency band related to the SDL and the UE supports the frequency band related to the SDL.

According to an embodiment, the generating of the UE capability information by considering the additional UE capability supported for SDL as being equal to the additional UE capability supported for TDD may include identifying whether an additional UE capability different from a common UE capability is supported for the SDL, configuring a parameter related to the additional UE capability supported for the TDD in TDD additional UE capability information, when the additional UE capability different from the common UE capability is supported for the SDL, and generating the UE capability information to include the TDD additional UE capability information.

According to an embodiment of the present disclosure, a UE in a wireless communication system includes a transceiver, and at least one processor configured to receive a UE capability inquiry message including information about an NR frequency band from a BS, generate UE capability information by considering an additional UE capability supported for SUL as being equal to an additional UE capability supported for FDD when the information about the NR frequency band includes information about a frequency band related to the SUL and the UE supports the frequency band related to the SUL, and transmit the generated UE capability information to the BS.

According to an embodiment, the at least one processor may identify whether an additional UE capability different from a common UE capability is supported for the SUL, configure a parameter related to the additional UE capability supported for the FDD in FDD additional UE capability information, when the additional UE capability different from the common UE capability is supported for the SUL, and generate the UE capability information to include the FDD additional UE capability information.

According to an embodiment, the FDD additional UE capability information may be information for reporting the additional UE capability supported for the FDD when the UE supports the FDD and TDD and the FDD and the TDD have an additional UE capability different from the common UE capability.

According to an embodiment, the at least one processor may configure a common UE capability related to the NR frequency band based on the UE capability inquiry message.

According to an embodiment, the common UE capability may include a UE capability applied to the UE regardless of duplex mode and frequency band.

According to an embodiment, the at least one processor may generate UE capability information by considering an additional UE capability supported for an SDL as being equal to an additional UE capability supported for TDD when the information about the NR frequency band includes information about a frequency band related to the SDL and the UE supports the frequency band related to the SDL.

According to an embodiment, the at least one processor may identify whether an additional UE capability different from a common UE capability is supported for the SDL, configure a parameter related to the additional UE capability supported for the TDD in TDD additional UE capability information, when the additional UE capability different from the common UE capability is supported for the SDL, and generate the UE capability information to include the TDD additional UE capability information.

Methods according to the claims of the present disclosure or the embodiments of the present disclosure described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the present disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the present disclosure through an external port. Furthermore, an extra storage device in the communication network may access a device that performs the embodiments of the present disclosure.

In the present disclosure, the term 'computer program product' or 'computer-readable recording medium' is used to generally indicate a medium such as a memory, a hard disc installed in a hard disc drive, and a signal. The computer program product or computer-readable recording medium is a device provided for the method of reporting UE capability according to the present disclosure.

In the embodiments of the present disclosure, a component is represented in a singular or plural form. It should be understood, however, that the singular or plural representations are selected appropriately according to the situations presented for convenience of explanation, and the present disclosure is not limited to the singular or plural form of the component. Further, the component expressed in the plural form may also imply the singular form, and vice versa.

Several embodiments of the present disclosure have been described, but a person of ordinary skill in the art will understand and appreciate that various modifications can be made without departing the scope of the present disclosure. Thus, it will be apparent to those of ordinary skill in the art that the present disclosure is not limited to the embodiments of the present disclosure, which have been provided only for illustrative purposes. Furthermore, the embodiments may be operated by being combined with one another if necessary. For example, an embodiment of the present disclosure and some of another embodiment of the present disclosure may be combined to operate the BS and the UE. The embodiments of the present disclosure may be equally applied to other communication systems, and other modifications of the embodiments may also be made without departing from the scope of the present disclosure. For example, the embodiments of the present disclosure may also be applied to an LTE system, 5G or NR system, etc.

Several embodiments of the present disclosure have thus been described, but it will be understood that various modifications can be made without departing the scope of the present disclosure. Thus, it will be apparent to those of ordinary skill in the art that the present disclosure is not limited to the embodiments described, but can encompass not only the appended claims but the equivalents.

The invention claimed is:

1. A method performed by a user equipment (UE) in a wireless communication system, the method comprising:
   receiving a UE capability inquiry message including information about a new radio (NR) frequency band from a base station;
   identifying whether an additional UE capability different from a UE capability indicated previously is supported for a supplementary uplink (SUL), in case that the UE supports the SUL;
   configuring a parameter related to the additional UE capability supported for the SUL in frequency division duplex (FDD) additional UE capability information, in case that the additional UE capability different from the UE capability indicated previously is supported for the SUL; and
   transmitting UE capability information including the FDD additional UE capability information to the base station.

2. The method of claim 1, wherein the UE capability indicated previously comprises a UE capability applied to the UE regardless of a duplex mode and a frequency band.

3. The method of claim 1, further comprising:
   identifying whether an additional UE capability different from the UE capability indicated previously is supported for a supplementary downlink (SDL), in case that the UE supports the SDL; and
   configuring a parameter related to the additional UE capability supported for the SDL in time division duplex (TDD) additional UE capability information, in case that the additional UE capability different from the UE capability indicated previously is supported for the SDL, wherein the UE capability information further includes the TDD additional UE capability information.

4. A user equipment (UE) in a wireless communication system, the UE comprising:

a transceiver; and at least one processor coupled with the transceiver and configured to:

receive a UE capability inquiry message including information about a new radio (NR) frequency band from a base station through the transceiver, identify whether an additional UE capability different from a UE capability indicated previously is supported for a supplementary uplink (SUL), in case that the UE supports the SUL, configure a parameter related to the additional UE capability supported for the SUL in frequency division duplex (FDD) additional UE capability information, in case that the additional UE capability different from the UE capability indicated previously is supported for the SUL, and transmit UE capability information including the FDD additional UE capability information to the base station through the transceiver.

5. The UE of claim 4, wherein the UE capability indicated previously comprises a UE capability applied to the UE regardless of a duplex mode and a frequency band.

6. The UE of claim 4, wherein the at least one processor is configured to:

identify whether an additional UE capability different from the UE capability indicated previously is supported for a supplementary downlink (SDL), in case that the UE supports the SDL, and configure a parameter related to the additional UE capability supported for the SDL in time division duplex (TDD) additional UE capability information, in case that the additional UE capability different from the UE capability indicated previously is supported for the SDL, wherein the UE capability information further includes the TDD additional UE capability information.

* * * * *